United States Patent
Guo et al.

(10) Patent No.: US 10,251,091 B2
(45) Date of Patent: Apr. 2, 2019

(54) TRAFFIC OFFLOADING METHOD AND APPARATUS

(71) Applicant: Huawei Technologies Co., Ltd., Shenzhen, Guangdong (CN)

(72) Inventors: Yaoliang Guo, Nanjing (CN); Liang Tang, Nanjing (CN); Weilian Jiang, Nanjing (CN); Hairong Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 15/423,922

(22) Filed: Feb. 3, 2017

(65) Prior Publication Data
US 2017/0150401 A1    May 25, 2017

Related U.S. Application Data

(63) Continuation of application No. PCT/CN2015/085441, filed on Jul. 29, 2015.

(30) Foreign Application Priority Data

Aug. 5, 2014 (CN) .......................... 2014 1 0382683

(51) Int. Cl.
*H04W 28/08* (2009.01)
*H04W 28/02* (2009.01)
(Continued)

(52) U.S. Cl.
CPC ......... *H04W 28/085* (2013.01); *H04L 47/125* (2013.01); *H04W 28/0236* (2013.01);
(Continued)

(58) Field of Classification Search
None
See application file for complete search history.

(56) References Cited

U.S. PATENT DOCUMENTS 6,690,678 B1 * 2/2004 Basso ................ H04L 12/5602
                                                      370/395.1
7,680,050 B1    3/2010 Sindhu
(Continued)

FOREIGN PATENT DOCUMENTS

CN    101369972 A    2/2009
CN    101646196 A    2/2010
(Continued)

OTHER PUBLICATIONS

Leymann et al., "GRE Tunnel Bonding"; Network Working Group Internet Draft; Jul. 6, 2015; 40 pages.
(Continued)

*Primary Examiner* — Eunsook Choi

(57) ABSTRACT

Embodiments of the present application disclose a traffic offloading method and apparatus. The method includes: calculating, by a first network node, a first packet loss rate of a first forwarding tunnel in a preset period; when the first packet loss rate is higher than a first preset threshold, reducing a rated bandwidth of the first forwarding tunnel by a first preset bandwidth, so as to obtain a first available bandwidth; and when traffic forwarded over the first forwarding tunnel exceeds the first available bandwidth, offloading excess to-be-forwarded traffic to the second data link for forwarding. Because the first available bandwidth is less than an original available bandwidth of the first forwarding tunnel, the to-be-forwarded traffic exceeds the first available bandwidth at an earlier time, traffic is offloaded by the first network node in advance, and a serious packet loss is less likely to occur before traffic offloading.

12 Claims, 6 Drawing Sheets

(51) Int. Cl.
*H04W 28/20* (2009.01)
*H04L 12/803* (2013.01)
*H04L 12/851* (2013.01)
*H04L 12/825* (2013.01)
*H04L 12/801* (2013.01)

(52) U.S. Cl.
CPC .............. *H04W 28/20* (2013.01); *H04L 47/24* (2013.01); *H04L 47/263* (2013.01); *H04L 47/29* (2013.01)

(56) References Cited

U.S. PATENT DOCUMENTS

| | | | |
|---|---|---|---|
| 7,787,370 B1* | 8/2010 | Aweya | H04L 45/245 370/230 |
| 9,680,767 B2* | 6/2017 | Karthikeyan | H04L 47/825 |
| 9,787,501 B2* | 10/2017 | Sung | H04L 12/4641 |
| 2006/0233175 A1* | 10/2006 | Ge | H04L 45/04 370/392 |
| 2012/0026865 A1 | 2/2012 | Fan et al. | |
| 2013/0322255 A1* | 12/2013 | Dillon | H04L 47/22 370/236 |
| 2015/0009991 A1* | 1/2015 | Sung | H04L 12/4633 370/392 |
| 2015/0295728 A1* | 10/2015 | Kadel | H04L 12/2863 370/235 |

FOREIGN PATENT DOCUMENTS

| | | |
|---|---|---|
| CN | 102811465 A | 12/2012 |
| CN | 104158761 A | 11/2014 |
| WO | 2009056172 A1 | 5/2009 |

OTHER PUBLICATIONS

Haifeng, Y.; "Split-flow Control and Optimization of Campus Network Traffic"; Agriculture Network Information; Feb. 2014; 3 pages.

Hua-biao et al.; "Secure Load Balance Algorithm Based on Moderate Flow Adjust"; Computer Engineering; Jul. 2009; 3 pages.

* cited by examiner

TRAFFIC OFFLOADING METHOD AND APPARATUS

CROSS-REFERENCE TO RELATED APPLICATIONS

This application is a continuation of International Application No. PCT/CN2015/085441, filed on Jul. 29, 2015, which claims priority to Chinese Patent Application No. 201410382683.1, filed on Aug. 5, 2014. The disclosures of the aforementioned applications are hereby incorporated by reference in their entireties.

TECHNICAL FIELD

The present application relates to the communications field, and in particular, to a traffic offloading method and apparatus.

BACKGROUND

Currently, hybrid access (Hybrid Access, HA) is a manner that is relatively commonly used by a user terminal to access a network. The hybrid access manner means that a user terminal accesses the network by using multiple types of data transmission links. A relatively typical application scenario of the hybrid access manner is that the user terminal accesses the network by using both a digital subscriber line (Digital Subscriber Line, DSL) link and a Long Term Evolution (Long Term Evolution, LTE) link.

FIG. 1 is a schematic diagram of a network topology of a hybrid access network. As shown in FIG. 1, a PC (personal computer), as a user terminal, is connected to a home gateway (Home Gateway, HG), there are a DSL link and an LTE link between the HG and a hybrid access aggregation point (Hybrid Access Aggregation Point, HAAP), and the HAAP is a network node of an access network. For example, a bandwidth of the DSL link is 50 Mbit/s, and a bandwidth of the LTE link is 100 Mbit/s. The user terminal first uses the DSL link to exchange data with the network. When traffic between the user terminal and the network exceeds 50 Mbit/s, which is the maximum bandwidth of the DSL link, an overflow (overflow) phenomenon occurs, and overflowed traffic of the bandwidth of the DSL link is off loaded to the LTE link for forwarding.

A bandwidth of a DSL link between an HG1 and a digital subscriber line access multiplexer (Digital Subscriber Line Access Multiplexer, DSLAM) and a bandwidth of a DSL link between an HG2 and the digital subscriber line access multiplexer can be ensured. However, the DSLAM is connected to the router (Router) and then to the HAAP by using an IP link, and a bandwidth provided to each user terminal cannot be ensured. Consequently, when a large quantity of HGs are connected to the DSLAM, though traffic forwarded over the DSL link does not exceed the bandwidth of the DSL link, a relatively serious packet loss phenomenon still occurs in a process in which traffic is forwarded over the IP link, and network quality is affected.

SUMMARY

The present application provides a traffic offloading method and apparatus, so as to reduce a packet loss.

According to a first aspect, embodiments of the present application provide a traffic off loading method, where a first network node and a second network node are connected by using a first data link and a second data link, a first forwarding tunnel from the first network node to the second network node is established on the first data link, and the first network node and the second network node are respectively a tunnel endpoint of the first forwarding tunnel; and the method includes:

calculating, by the first network node, a first packet loss rate of the first forwarding tunnel in a preset period;

when the first packet loss rate is higher than a first preset threshold, reducing, by the first network node, a rated bandwidth of the first forwarding tunnel by a first preset bandwidth, so as to obtain a first available bandwidth; and when traffic forwarded over the first forwarding tunnel exceeds the first available bandwidth, offloading, by the first network node, excess to-be-forwarded traffic to the second data link for forwarding.

In a first possible implementation manner of the first aspect, the method further includes:

when the first packet loss rate is lower than a second preset threshold, increasing, by the first network node, the first available bandwidth by a second preset bandwidth, so as to obtain a second available bandwidth, where the second preset bandwidth is less than or equal to the first preset bandwidth, and the second available bandwidth is less than or equal to the rated bandwidth of the first forwarding tunnel that is of the first data link and that is from the first network node to the second network node.

With reference to the first aspect or the first possible implementation manner of the first aspect, in a second possible implementation manner, the calculating, by the first network node, a first packet loss rate of the first forwarding tunnel in a preset period specifically includes:

sending, by the first network node, a first counting packet to the second network node at an interval of the preset period, where the first counting packet carries a total quantity of data packets sent by the first network node to the second network node in the preset period by using the first forwarding tunnel;

receiving, by the first network node, a second counting packet returned by the second network node, where the second counting packet carries the total quantity that is carried in the first counting packet and that is of data packets sent by the first network node to the second network node in the preset period by using the first forwarding tunnel, and a total quantity of data packets received by the second network node from the first network node in the preset period by using the first forwarding tunnel; and calculating, by the first network node according to the total quantity that is carried in the second counting packet and that is of the data packets sent by the first network node to the second network node, and the total quantity of the data packets received by the second network node from the first network node, the first packet loss rate that is of the first forwarding tunnel and that is corresponding to the preset period.

In a third possible implementation manner of the first aspect, a second forwarding tunnel from the second network node to the first network node is further established on the first data link, and the first network node and the second network node are respectively a tunnel endpoint of the second forwarding tunnel; and the method includes:

calculating, by the first network node, a second packet loss rate of the second forwarding tunnel in the preset period; and when the second packet loss rate is higher than a third preset threshold, sending, by the first network node, a bandwidth notification packet to the second network node, where the bandwidth notification packet is used to instruct the second network node to reduce a rated bandwidth of the second forwarding tunnel by a third preset bandwidth, so as to obtain a third available bandwidth.

With reference to the third possible implementation manner of the first aspect, in a fourth possible implementation manner, the method further includes:

when traffic forwarded over the second forwarding tunnel exceeds the third available bandwidth, offloading, by the second network node, excess to-be-forwarded traffic to the second data link for forwarding.

With reference to the first aspect, or the first, the second, the third, or the fourth possible implementation manner of the first aspect, in a fifth possible implementation manner, the first data link includes a digital subscriber line DSL link and an Internet Protocol IP link; and the second data link is a Long Term Evolution LTE link.

With reference to the first aspect, or the first, the second, the third, the fourth, or the fifth possible implementation manner of the first aspect, in a sixth possible implementation manner, when the first network node is a home gateway HG, the second network node is a hybrid access aggregation point HAAP; or when the first network node is an HAAP, the second network node is an HG.

According to a second aspect, the embodiments of the present application provide a traffic offloading apparatus, where a first network node and a second network node are connected by using a first data link and a second data link, a first forwarding tunnel from the first network node to the second network node is established on the first data link, and the first network node and the second network node are respectively a tunnel endpoint of the first forwarding tunnel; and the apparatus includes:

a first calculation unit, configured to calculate a first packet loss rate of the first forwarding tunnel in a preset period;

a bandwidth reduction unit, configured to: when an execution result of the first calculation unit is that the first packet loss rate is higher than a first preset threshold, reduce a rated bandwidth of the first forwarding tunnel by a first preset bandwidth, so as to obtain a first available bandwidth; and a first offloading unit, configured to: when traffic forwarded over the first forwarding tunnel exceeds the first available bandwidth, offload excess to-be-forwarded traffic to the second data link for forwarding.

In a first possible implementation manner of the second aspect, the apparatus further includes:

a bandwidth increasing unit, configured to: when an execution result of the first calculation unit is that the first packet loss rate is lower than a second preset threshold, increase the first available bandwidth by a second preset bandwidth, so as to obtain a second available bandwidth, where the second preset bandwidth is less than or equal to the first preset bandwidth, and the second available bandwidth is less than or equal to the rated bandwidth of the first forwarding tunnel that is of the first data link and that is from the first network node to the second network node.

With reference to the second aspect or the first possible implementation manner of the second aspect, in a second possible implementation manner, the first calculation unit includes:

a first counting packet sending subunit, configured to send a first counting packet to the second network node at an interval of the preset period, where the first counting packet carries a total quantity of data packets sent by the first network node to the second network node in the preset period by using the first forwarding tunnel;

a second counting packet receiving subunit, configured to receive a second counting packet returned by the second network node, where the second counting packet carries the total quantity that is carried in the first counting packet and that is of data packets sent by the first network node to the second network node in the preset period by using the first forwarding tunnel, and a total quantity of data packets received by the second network node from the first network node in the preset period by using the first forwarding tunnel; and a first packet loss rate calculation subunit, configured to calculate, according to the total quantity that is carried in the second counting packet and that is of the data packets sent by the first network node to the second network node, and the total quantity of the data packets received by the second network node from the first network node, the first packet loss rate that is of the first forwarding tunnel and that is corresponding to the preset period.

In a third possible implementation manner of the second aspect, a second forwarding tunnel from the second network node to the first network node is further established on the first data link, and the first network node and the second network node are respectively a tunnel endpoint of the second forwarding tunnel; and the apparatus includes:

a second calculation unit, configured to calculate a second packet loss rate of the second forwarding tunnel in the preset period; and a sending unit, configured to send a bandwidth notification packet to the second network node when an execution result of the second calculation unit is that the second packet loss rate is higher than a third preset threshold, where the bandwidth notification packet is used to instruct the second network node to reduce a rated bandwidth of the second forwarding tunnel by a third preset bandwidth, so as to obtain a third available bandwidth.

With reference to the third possible implementation manner of the second aspect, in a fourth possible implementation manner, the apparatus further includes:

a second offloading unit, configured to: when traffic forwarded over the second forwarding tunnel exceeds the third available bandwidth, offload excess to-be-forwarded traffic to the second data link for forwarding.

With reference to the second aspect, or the first, the second, the third, or the fourth possible implementation manner of the second aspect, in a fifth possible implementation manner, the first data link includes a digital subscriber line DSL link and an Internet Protocol IP link; and the second data link is a Long Term Evolution LTE link.

With reference to the second aspect, or the first, the second, the third, the fourth, or the fifth possible implementation manner of the second aspect, in a sixth possible implementation manner, when the first network node is a home gateway HG, the second network node is a hybrid access aggregation point HAAP; or when the first network node is an HAAP, the second network node is an HG.

It can be learned from the foregoing technical solutions that in a case in which a packet loss rate of the first forwarding tunnel is relatively high, the first network node reduces a rated bandwidth of the first forwarding tunnel to obtain a first available bandwidth, so that when traffic forwarded over the first forwarding tunnel is increasing, once the traffic exceeds the first available bandwidth, excess to-be-forwarded traffic is offloaded to the second data link for forwarding. Because the first available bandwidth is less than an original available bandwidth of the first forwarding tunnel, the to-be-forwarded traffic exceeds the first available bandwidth at an earlier time, traffic is offloaded by the first network node in advance, and a serious packet loss is less likely to occur before traffic offloading.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

Figure 1:
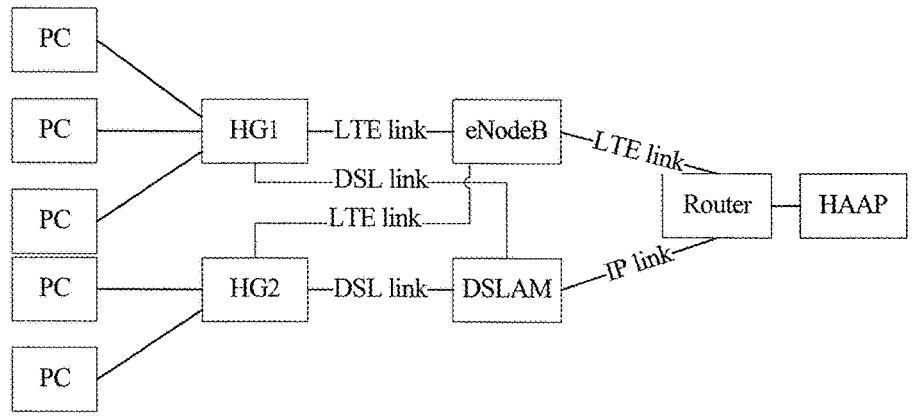
FIG. 1 is a schematic diagram of a network topology of a hybrid access network.

In a case in which a user terminal accesses a network in a hybrid access manner, and to-be-forwarded traffic is relatively low, the user terminal generally establishes a forwarding tunnel, which is used for forwarding traffic, only in a data link A. Only when the to-be-forwarded traffic exceeds a rated bandwidth of the established forwarding tunnel, it is considered that excess traffic is off loaded to another data link B for forwarding. Because of various cases (for example, a bandwidth cannot be ensured and a relatively large quantity of user terminals are connected), a packet loss phenomenon may occur on the data link A before the traffic forwarded over the forwarding tunnel reaches the rated bandwidth of the forwarding tunnel. However, because the to-be-forwarded traffic does not exceed the rated bandwidth of the forwarding tunnel, a system does not offload the to-be-forwarded traffic to the data link B for forwarding. The rated bandwidth described herein refers to a size of a bandwidth allocated by the data link A to the forwarding tunnel. It can be learned that the rated bandwidth of the forwarding tunnel is less than or equal to a rated bandwidth of the data link A. That is, a system cannot resolve a packet loss phenomenon. Consequently, user experience is greatly affected because the packet loss phenomenon always exists. Therefore, in embodiments of the present application, in a case in which a packet loss rate of the first forwarding tunnel is relatively high, the first network node reduces a rated bandwidth of the first forwarding tunnel to obtain a first available bandwidth, so that when traffic forwarded over the first forwarding tunnel is increasing, and if the traffic exceeds the first available bandwidth, to-be-forwarded traffic that exceeds the first available bandwidth is offloaded to the second data link for forwarding. Because the first available bandwidth is less than an original rated bandwidth of the first forwarding tunnel, the to-be-forwarded traffic exceeds the first available bandwidth at an earlier time, traffic is offloaded by the first network node in advance, and a serious packet loss is less likely to occur before traffic offloading.

When a packet loss rate of the first forwarding tunnel is gradually reduced to a value less than a second preset threshold, it can be determined that higher traffic may be normally forwarded in a forwarding environment of the first forwarding tunnel. The first network device further increases the reduced first available bandwidth of the first forwarding tunnel by the second preset bandwidth, so that the first network device may use the first forwarding tunnel to forward higher traffic than before, where the increased traffic refers to traffic supported by the second preset bandwidth. Therefore, when a forwarding environment of the first forwarding tunnel is improved, a first available bandwidth of the first forwarding tunnel is increased, so that the first forwarding tunnel forwards relatively high traffic, thereby improving utilization of network resources.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Embodiment 1

Figure 2:
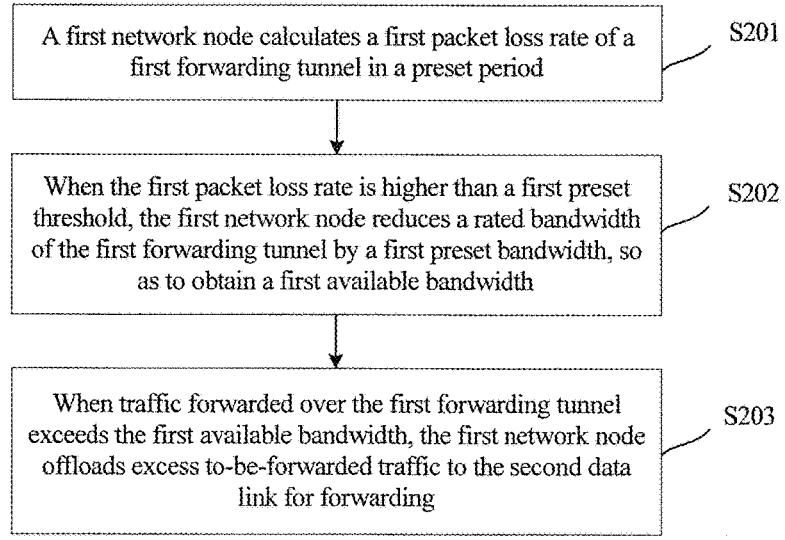
FIG. 2 is a flowchart of a traffic off loading method according to an embodiment of the present application.

FIG. 2 is a flowchart of a traffic off loading method according to an embodiment of the present application. A first network node and a second network node are connected by using a first data link and a second data link, a first forwarding tunnel from the first network node to the second network node is established on the first data link, and the first network node and the second network node are respectively a tunnel endpoint of the first forwarding tunnel.

It can be learned that this embodiment of the present application may be applied in a scenario in which a network is accessed in a hybrid access manner. Two network nodes are connected by using two or more data links. The first data link is used between the first network node and the second network node as a preferential data link for forwarding traffic, that is, only when traffic forwarded over the first data link exceeds a specific threshold, excess traffic is offloaded to the second data link for forwarding. In an application scenario with a user terminal, this embodiment of the present application does not limit that the user terminal is connected only to the first network node or the second network node.

As shown in FIG. 2, the method includes:

S201. The first network node calculates a first packet loss rate of the first forwarding tunnel in a preset period.

Figure 3:
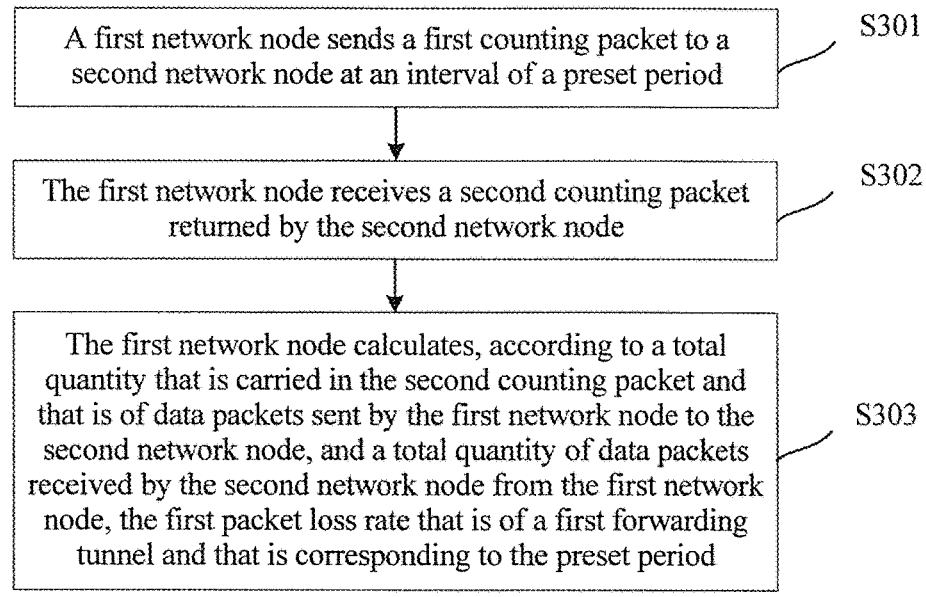
FIG. 3 is a flowchart of a method for calculating a packet loss rate of a forwarding tunnel according to an embodiment of the present application.

It should be noted that the first packet loss rate refers to an endpoint-to-endpoint packet loss rate of the first forwarding tunnel, that is, a difference between a quantity of data packets sent by the first network node to the second network node by using the first forwarding tunnel and a quantity of data packets received by the second network node from the first network node by using the first forwarding tunnel. A higher packet loss rate indicates that the first forwarding tunnel is less likely to normally forward current traffic. This embodiment of the present application provides a method for calculating a packet loss rate. As shown in FIG. 3, where FIG. 3 is a flowchart of a method for calculating a packet loss rate of a forwarding tunnel according to an embodiment of the present application, the method includes the following steps:

S301. The first network node sends a first counting packet to the second network node at an interval of the preset period, where the first counting packet carries a total quantity of data packets sent by the first network node to the second network node in the preset period by using the first forwarding tunnel.

S302. The first network node receives a second counting packet returned by the second network node, where the second counting packet carries the total quantity that is carried in the first counting packet and that is of data packets sent by the first network node to the second network node in the preset period by using the first forwarding tunnel, and a total quantity of data packets received by the second network node from the first network node in the preset period by using the first forwarding tunnel.

S303. The first network node calculates, according to the total quantity that is carried in the second counting packet and that is of the data packets sent by the first network node to the second network node, and the total quantity of the data packets received by the second network node from the first network node, the first packet loss rate that is of the first forwarding tunnel and that is corresponding to the preset period.

For example, the preset period is 10 seconds, a total quantity of data packets in the first counting packet sent by the first network node to the second network node is 1000, and a total quantity of data packets that are in the returned second counting packet received by the first network node and that are received by the second network node from the first network node is 950. After the preset period of 10 seconds, a total quantity of data packets in the first counting packet that is sent again to the second network node is 1200, and a total quantity of data packets that are in the returned second counting packet received by the first network node and that are received by the second network node from the first network node is 1140. It can be calculated, according to the two returned second counting packets, that there are totally 200 data packets sent by the first network node by using the first forwarding tunnel in the preset period, and there are totally 190 data packets received by the second network node by using the first forwarding tunnel. Therefore, 10 data packets are lost, and a packet loss rate may be indicated as 5% or in another manner. Certainly, a total quantity of data packets sent in multiple preset periods may be used to calculate an average value of packet loss rates of the multiple preset periods, and the present application imposes no limitation herein.

S202. When the first packet loss rate is higher than a first preset threshold, the first network node reduces a rated bandwidth of the first forwarding tunnel by a first preset bandwidth, so as to obtain a first available bandwidth.

It should be noted that, in the prior art, the rated bandwidth of the first forwarding tunnel is a bandwidth condition for the first network device to determine whether to offload traffic to the second data link. However, in this embodiment of the present application, a packet loss rate is calculated, the first available bandwidth is obtained by reducing the rated bandwidth of the first forwarding tunnel by the first preset bandwidth, and the bandwidth condition for determining whether to offload traffic is determined as the first available bandwidth. In this way, a traffic offloading operation may be triggered when traffic forwarded over the first forwarding tunnel does not reach the rated bandwidth of the first forwarding tunnel but already exceeds the first available bandwidth. It should further be noted that if the traffic forwarded over the first forwarding tunnel does not reach the first available bandwidth even after the first preset bandwidth is subtracted once, traffic offloading cannot be triggered. However, when a packet loss rate of the first forwarding tunnel is still higher than the first preset threshold, the first available bandwidth is subsequently reduced, by the first preset bandwidth after the first preset bandwidth is subtracted for the previous time, until the traffic forwarded over the first forwarding tunnel reaches a new first available bandwidth and traffic offloading is triggered, or the packet loss rate of the first forwarding tunnel is lower than the first preset threshold.

The first preset bandwidth may be a preset fixed bandwidth, or may be a bandwidth determined according to a packet loss rate. When the first preset bandwidth is a bandwidth determined according to a packet loss rate, optionally, the present application provides a manner for calculating the first available bandwidth, as shown in formula 1:

$$DL\_TunnelBW(i)=DL\_BW-\Sigma DL\_LBR(i)-DL\_BypassBW(i) \quad \text{(Formula 1)}$$

where:

$DL\_TunnelBW(i)$ is a first available bandwidth of the first forwarding tunnel in an $i^{th}$ period;

$DL\_BW$ is a rated bandwidth of the first forwarding tunnel that is of the first data link and that is from the first network node to the second network node;

$\Sigma DL\_LBR(i)$ is traffic of lost packets that is corresponding to an accumulated packet loss rate of the first forwarding tunnel in the $i^{th}$ period; and $DL\_BypassBW(i)$ is a bandwidth occupied by traffic forwarded over the first data link, in the $i^{th}$ period, from the first network node to the second network node without using the first forwarding tunnel.

It can be learned from formula 1 that when the packet loss rate is higher than the first preset threshold, the first preset bandwidth subtracted from the rated bandwidth of the first forwarding tunnel is traffic of lost packets that is corresponding to the sum of packet loss rates accumulated since the first network device starts to calculate the packet loss rate. A correspondence may be established between such settings on the first preset bandwidth and a forwarding situation of the first forwarding tunnel. A higher packet loss rate indicates more bandwidth subtracted, so that the traffic currently forwarded over the first forwarding tunnel may exceed the first available bandwidth at an earlier time, so as to trigger the first network device to offload traffic. It can also be learned that, for formula 1, it should further be considered that there may be a part of traffic forwarded over the first data link from the first network node to the second network node without using the first forwarding tunnel, and an amount of this part of traffic may change with time and a forwarding situation.

S203. When traffic forwarded over the first forwarding tunnel exceeds the first available bandwidth, the first network node offloads excess to-be-forwarded traffic to the second data link for forwarding.

It can be learned that in a case in which a packet loss rate of the first forwarding tunnel is relatively high, the first network node reduces a rated bandwidth of the first forwarding tunnel to obtain the first available bandwidth, so that when traffic forwarded over the first forwarding tunnel is increasing, and once the traffic exceeds the first available bandwidth, excess to-be-forwarded traffic is offloaded to the second data link for forwarding. Because the first available bandwidth is less than an original rated bandwidth of the first forwarding tunnel, to-be-forwarded traffic exceeds the first available bandwidth at an earlier time, traffic is offloaded by the first network node in advance, and a serious packet loss is less likely to occur before traffic offloading, so that user experience is improved.

After the rated bandwidth of the first forwarding tunnel is reduced by the first preset bandwidth because of a relatively high packet loss rate of the first forwarding tunnel, as a network forwarding state changes and the packet loss rate decreases, the first network device needs to gradually restore the rated bandwidth of the first forwarding tunnel, so as to improve a traffic forwarding capability of the first forwarding tunnel on the first data link, thereby avoiding a waste of network resources. In this embodiment of the present application, a size of the packet loss rate of the first forwarding tunnel is determined, so as to increase the bandwidth of the first forwarding tunnel.

Figure 4:
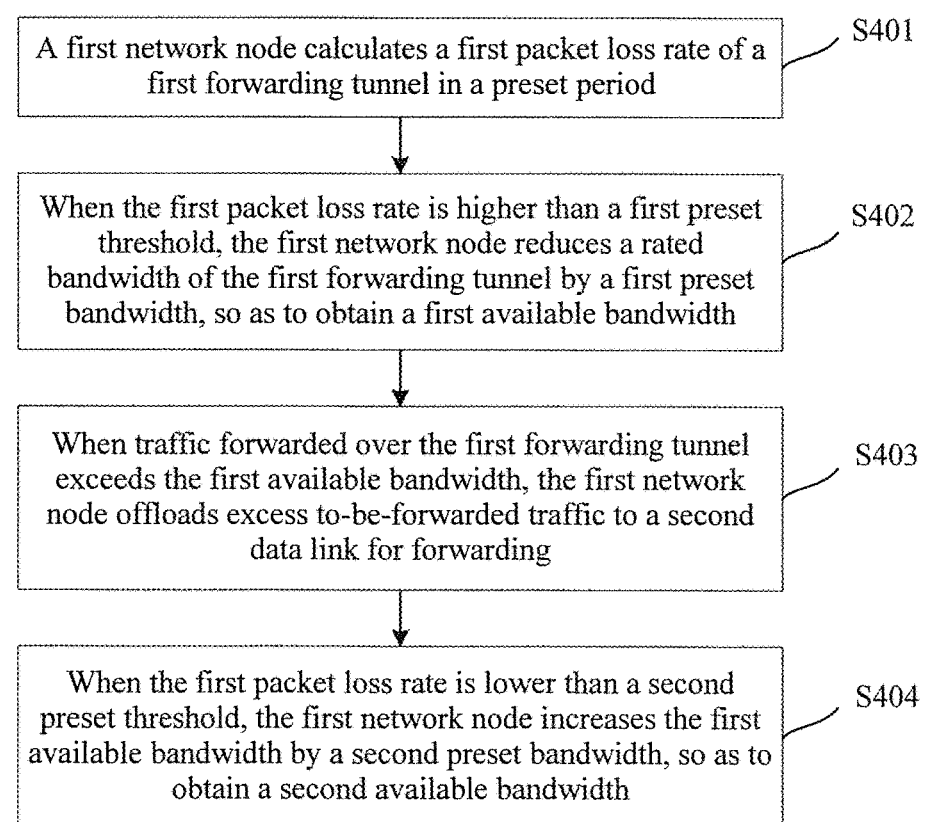
FIG. 4 is a flowchart of a traffic offloading method according to an embodiment of the present application.

FIG. 4 is a flowchart of a traffic offloading method according to an embodiment of the present application. As shown in FIG. 4:

S401. The first network node calculates a first packet loss rate of the first forwarding tunnel in a preset period.

S402. When the first packet loss rate is higher than a first preset threshold, the first network node reduces a rated bandwidth of the first forwarding tunnel by a first preset bandwidth, so as to obtain a first available bandwidth.

S403. When traffic forwarded over the first forwarding tunnel exceeds the first available bandwidth, the first network node off loads excess to-be-forwarded traffic to the second data link for forwarding.

S404. When the first packet loss rate is lower than a second preset threshold, the first network node increases the first available bandwidth by a second preset bandwidth, so as to obtain a second available bandwidth, where the second preset bandwidth is less than or equal to the first preset bandwidth, and the second available bandwidth is less than or equal to the rated bandwidth of the first forwarding tunnel that is of the first data link and that is from the first network node to the second network node.

It should be noted that no limitation is imposed on an execution sequence of S403 and S404. S404 does not necessarily need to be executed after traffic offloading in S403 is performed. S404 may be executed after S402 is executed and the first available bandwidth is obtained, so as to determine whether the first packet loss rate is lower than the second preset threshold. The second preset threshold is lower than the first preset threshold.

When the first packet loss rate is lower than the second preset threshold, it indicates that forwarding condition of the first forwarding link is relatively good (for example, a quantity of user terminals currently connected to the first forwarding tunnel is reduced). The first network device may gradually increase the first preset bandwidth that is reduced. In a case in which that no traffic is forwarded over the first data link from the first network node to the second network node by using the first forwarding tunnel is not considered, a largest value of the second available bandwidth obtained after the increasing cannot exceed the rated bandwidth of the first forwarding tunnel that is of the first data link and that is from the first network node to the second network node.

After the second preset bandwidth is added once, if the first packet loss rate remains to be lower than the second preset threshold, a bandwidth of the first forwarding tunnel may be continuously increased until the first packet loss rate exceeds the second preset threshold again.

On the first data link, generally, in addition to a forwarding tunnel from the first network node to the second network node, a forwarding tunnel from the second network node to the first network node also exists.

Figure 5:
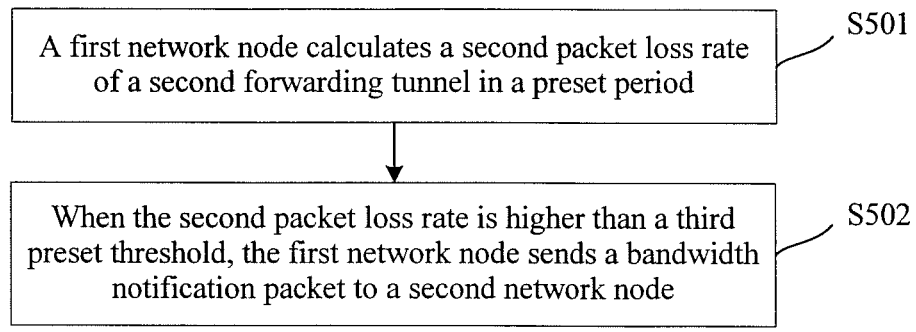
FIG. 5 is a flowchart of a traffic off loading method according to an embodiment of the present application.

Optionally, based on the method in FIG. 4, FIG. 5 is a flowchart of a traffic offloading method according to an embodiment of the present application, where a second forwarding tunnel from the second network node to the first network node is further established on the first data link, and the first network node and the second network node are respectively a tunnel endpoint of the second forwarding tunnel. As shown in FIG. 5, the method includes:

S501. The first network node calculates a second packet loss rate of the second forwarding tunnel in the preset period.

It should be noted that the second forwarding tunnel forwards traffic from the second network node to the first network node; therefore when the first network node, which serves as a data packet receiving party, calculates the packet loss rate of the second forwarding tunnel in the preset period, generally, a total quantity of data packets sent by the second network node by using the second forwarding tunnel needs to be first acquired. In the following specific application scenario, that how the first network node calculates the second packet loss rate of the second forwarding tunnel is described.

S502. When the second packet loss rate is higher than a third preset threshold, the first network node sends a bandwidth notification packet to the second network node, where the bandwidth notification packet is used to instruct the second network node to reduce a rated bandwidth of the second forwarding tunnel by a third preset bandwidth, so as to obtain a third available bandwidth.

Because the first network node is a destination endpoint of the second forwarding tunnel, when an operation for reducing the rated bandwidth of the second forwarding tunnel needs to be performed, the first network node needs to instruct the second network node, which is a source endpoint of the second forwarding tunnel, to reduce the rated bandwidth of the second forwarding tunnel, so as to obtain the third available bandwidth. The bandwidth notification packet may be a generic routing encapsulation (Generic Routing Encapsulation, GRE) packet.

When the traffic forwarded over the second forwarding tunnel exceeds the third available bandwidth, an offloading operation on an excess traffic is also executed by the second network node. That is, optionally, the method further includes: When the traffic forwarded over the second forwarding tunnel exceeds the third available bandwidth, the second network node offloads the excess to-be-forwarded traffic to the second data link for forwarding.

The following gives further description on the technical solution of the present application by using a specific application scenario in which a network is accessed in a hybrid access manner. A technical solution in the specific scenario is described based on the foregoing embodiment. The first data link is a data link that includes a DSL link and an IP link, and the second data link is an LTE link. When the first network node is an HG, the second network node is an HAAP; or when the first network node is an HAAP, the second network node is an HG. In this application scenario, it is assumed that the first network node is an HG, and the second network node is an HAAP. A network topology of the application scenario is shown in FIG. 1, where a first forwarding tunnel that is from the HG to the HAAP and a second forwarding tunnel that is from the HAAP to the HG are established between the HG and the HAAP. The first forwarding tunnel and the second forwarding tunnel are based on the first data link. Optionally, the first forwarding tunnel and the second forwarding tunnel may be GRE tunnels. When the HG calculates the first packet loss rate of the first forwarding tunnel, optionally, the HG may further calculate the second packet loss rate of the second forwarding tunnel.

Figure 6:
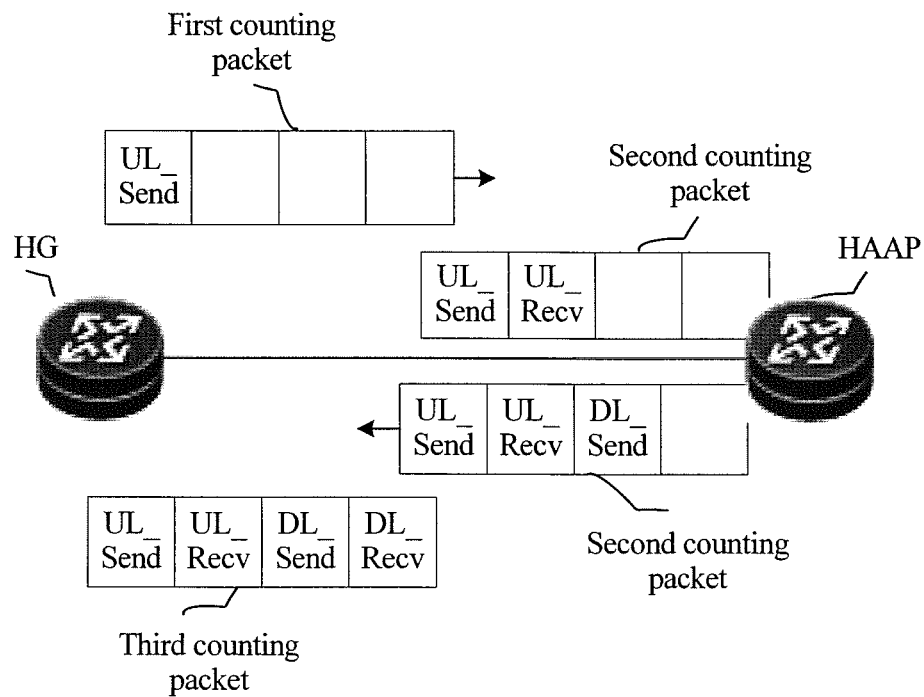
FIG. 6 is a schematic diagram of calculation of a packet loss rate of a forwarding tunnel according to an embodiment of the present application.

As shown in FIG. 6, FIG. 6 is a schematic diagram of calculation of a packet loss rate of a forwarding tunnel according to an embodiment of the present application. In FIG. 6, the HG sends the first counting packet, where the first counting packet carries a total quantity of data packets (UL_Send) sent by the HG to the HAAP by using the first forwarding tunnel. When the first counting packet is received by the HAAP, the HAAP adds a total quantity of data packets (UL_Recv) received by the HAAP by using the first forwarding tunnel into the first counting packet. In addition, the HAAP may further add a total quantity of data packets (DL_Send) sent to the HG by using the second forwarding tunnel into the first counting packet, so as to form a second counting packet, and send the second counting packet to the HG by using the second forwarding tunnel, where the second counting packet carries the UL_Send, the UL_Recv, and the DL_Send. After the second counting packet is received by the HG by using the second forwarding tunnel, the HG may add the total quantity of data packets (DL_Recv) received by using the second forwarding tunnel into the second counting packet, so as to form a third counting packet, and send the third counting packet to the HAAP by using the first forwarding tunnel. All of the first counting packet, the second counting packet, and the third counting packet can be obtained by means of expansion on the basis of an existing GRE packet. The GRE packet includes type-length-value (Type-length-value, TLV), where lengths of a T field and an L field are generally fixed (generally 1 to 4 bytes), and a length of V field is variable. The T field indicates a packet type, an L field indicates a packet length, and the V field is generally used to store content of a packet, and therefore the GRE packet is highly expansible.

The HG sends the first counting packet at an interval of a preset period. Therefore, the HG may subtract, from the UL_Send carried in the second counting packet received at the current time, the UL_Send carried in the second counting packet received at the previous time, so as to obtain a total quantity A of data packets that are sent, by using the first forwarding tunnel, to the HAAP during the preset period from the previous time of sending the first counting packet to the current time of sending the first counting packet; and the HG may subtract, from the UL_Recv carried in the second counting packet received at the current time, the UL_Recv carried in the second counting packet received at the previous time, so as to obtain a total quantity B of data packets that are received, by using the first forwarding tunnel, by the HAAP during the preset period from the previous time of sending the first counting packet to the current time of sending the first counting packet. The first packet loss rate in the preset period may be obtained by subtracting B from A. Likewise, the HG may also obtain a second packet loss rate of the second forwarding tunnel by using the DL_Send in the second counting packet and the DL_Recv acquired by the HG.

The first forwarding tunnel is used as an example. When the HG determines that the first packet loss rate is higher than a first preset threshold, the HG may adjust a bandwidth of the first forwarding tunnel according to formula 1. It is assumed that the DL_BW is 50 Mbit/s, a current DL_BypassBW is 5 Mbit/s, the ΣDL_LBR is 5 Mbit/s, and a current first available bandwidth, that is, the DL_TunnelBW, is 40 Mbit/s, so that a rated bandwidth of the first forwarding tunnel is 50 Mbit/s−5 Mbit/s=45 Mbit/s. When a bandwidth occupied by traffic forwarded over the first forwarding tunnel exceeds 40 Mbit/s (the first available bandwidth), the HG starts to offload traffic that exceeds 40 Mbit/s to the second data link (an LTE link) without waiting until the bandwidth occupied by the traffic forwarded over the first forwarding tunnel exceeds 45 Mbit/s (the rated bandwidth of the first forwarding tunnel).

The second forwarding tunnel is used as an example. When the HG determines that the second packet loss rate is higher than a third preset threshold, the HG sends a bandwidth notification packet to the HAAP, where the bandwidth notification packet carries a value of the third available bandwidth obtained after the third preset bandwidth is subtracted, and the bandwidth notification packet may be a notification (Notify) packet. The HAAP reduces the rated bandwidth of the second forwarding tunnel to the third available bandwidth according to the value of the third available bandwidth carried in the bandwidth notification packet.

A size of the second preset bandwidth may further be correspondingly adjusted according to different application scenarios. For example, in a current network environment, a quantity of user terminals that access a network in a time period in an evening is relatively large, but a quantity of user terminals that access a network in a time period in a morning is relatively small. For such a typical network usage situation, in the time period in the evening when traffic forwarded over a forwarding tunnel does not exceed a rated bandwidth and a packet loss rate is relatively high, in the technical solution of the present application, the rated bandwidth of the forwarding tunnel is reduced by the first preset bandwidth, and when the packet loss rate of the forwarding tunnel is relatively low, a value that is far lower than the first preset bandwidth may be selected as the second preset bandwidth to be added each time. Because there is heavy access traffic in an evening, a quantity of the user terminals remains to be relatively large. If a relatively high bandwidth is increased at a time, a situation in which the bandwidth needs to be reduced may reoccur soon; consequently, an available bandwidth of the forwarding tunnel is fluctuant. However, a manner in which the bandwidth is increased slowly may better adapt to a network access environment in the evening, a situation in which the available bandwidth of the forwarding tunnel is fluctuant does not occur or is less likely to occur. Because the quantity of user terminals that access a network in the morning is relatively small, though a situation in which the bandwidth of the forwarding tunnel needs to be reduced occurs, the situation is occasional. Therefore, a size of the second preset bandwidth may be properly increased. Therefore, in the technical solution of the present application, after the bandwidth of the forwarding tunnel is reduced, the rated bandwidth of the forwarding tunnel may be relatively quickly restored, thereby avoiding a waste of the network resources.

It can be learned that in a case in which a packet loss rate of the first forwarding tunnel is relatively high, the first network node reduces a rated bandwidth of the first forwarding tunnel to obtain the first available bandwidth, so that when traffic forwarded over the first forwarding tunnel is increasing, and once the traffic exceeds the first available bandwidth, excess to-be-forwarded traffic is offloaded to the second data link for forwarding. Because the first available bandwidth is less than an original rated bandwidth of the first forwarding tunnel, to-be-forwarded traffic exceeds the first available bandwidth at an earlier time, traffic is off loaded by the first network node in advance, and a serious packet loss is less likely to occur before traffic offloading, so that user experience is improved. When a packet loss rate of the first forwarding tunnel is gradually reduced to a value less than a second preset threshold, it can be determined that higher traffic may be normally forwarded in a forwarding environment of the first forwarding tunnel. The first network device further increases the reduced first available bandwidth of the first forwarding tunnel by the second preset bandwidth, so that the first network device may use the first forwarding tunnel to forward higher traffic than before, where the increased traffic refers to traffic supported by the second preset bandwidth. Therefore, when a forwarding environment of the first forwarding tunnel is improved, a first available bandwidth of the first forwarding tunnel is increased, so that the first forwarding tunnel forwards relatively high traffic, thereby improving utilization of network resources.

Embodiment 2

Figure 7:
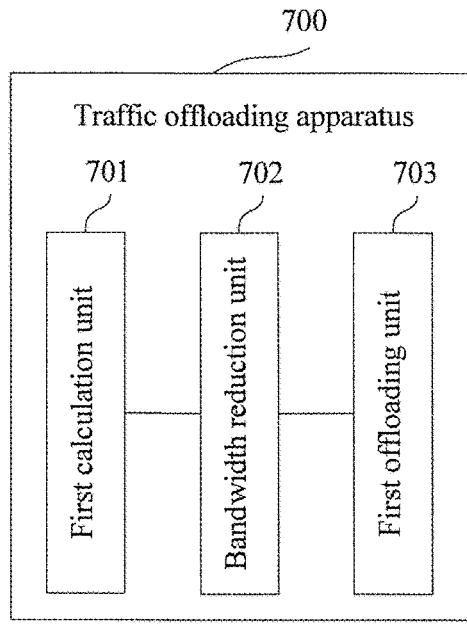
FIG. 7 is a structural diagram of a traffic offloading apparatus according to an embodiment of the present application.

FIG. 7 is a structural diagram of a traffic offloading apparatus according to an embodiment of the present application. A first network node and a second network node are connected by using a first data link and a second data link, a first forwarding tunnel from the first network node to the second network node is established on the first data link, and the first network node and the second network node are respectively a tunnel endpoint of the first forwarding tunnel. A traffic offloading apparatus 700 shown in FIG. 7 includes a first calculation unit 701, a bandwidth reduction unit 702, and a first offloading unit 703. The first calculation unit 701 is configured to calculate a first packet loss rate of the first forwarding tunnel in a preset period. The bandwidth reduction unit 702 is configured to: when an execution result of the first calculation unit 701 is that the first packet loss rate is higher than a first preset threshold, reduce a rated bandwidth of the first forwarding tunnel by a first preset bandwidth, so as to obtain a first available bandwidth. The first offloading unit 703 is configured to: when traffic forwarded over the first forwarding tunnel exceeds the first available bandwidth, offload excess to-be-forwarded traffic to the second data link for forwarding.

Figure 8:
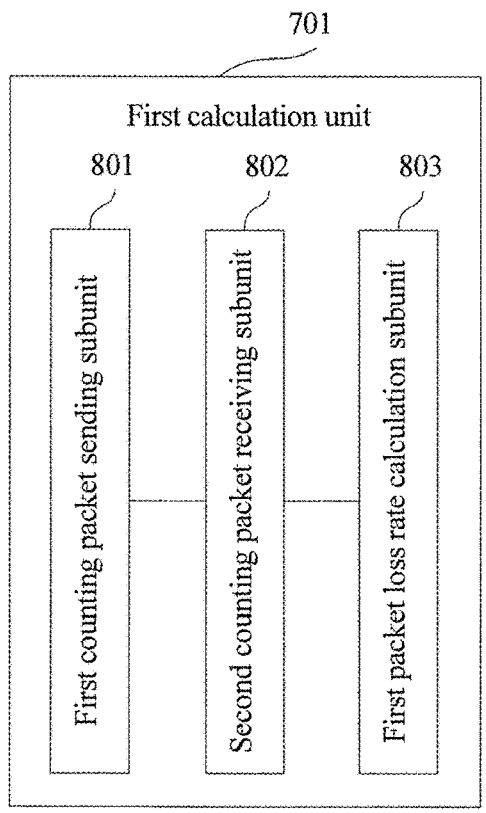
FIG. 8 is a structural diagram of a traffic offloading apparatus according to an embodiment of the present application.

It should be noted that the first packet loss rate refers to an endpoint-to-endpoint packet loss rate of the first forwarding tunnel, that is, a difference between a quantity of data packets sent by the first network node to the second network node by using the first forwarding tunnel and a quantity of data packets received by the second network node from the first network node by using the first forwarding tunnel. A higher packet loss rate indicates that the first forwarding tunnel is less likely to normally forward current traffic. This embodiment of the present application provides an apparatus for calculating a packet loss rate. As shown in FIG. 8, FIG. 8 is a structural diagram of an apparatus for calculating a packet loss rate of a forwarding tunnel according to an embodiment of the present application. The first calculation unit 701 includes a first counting packet sending subunit 801, a second counting packet receiving subunit 802, and a first packet loss rate calculation subunit 803, where:

the first counting packet sending subunit 801 is configured to send a first counting packet to the second network node at an interval of the preset period, where the first counting packet carries a total quantity of data packets sent by the first network node to the second network node in the preset period by using the first forwarding tunnel;

the second counting packet receiving subunit 802 is configured to receive a second counting packet returned by the second network node, where the second counting packet carries the total quantity that is carried in the first counting packet and that is of data packets sent by the first network node to the second network node in the preset period by using the first forwarding tunnel, and a total quantity of data packets received by the second network node from the first network node in the preset period by using the first forwarding tunnel; and the first packet loss rate calculation subunit 803 is configured to calculate, according to the total quantity that is carried in the second counting packet and that is of the data packets sent by the first network node to the second network node, and the total quantity of the data packets received by the second network node from the first network node, the first packet loss rate that is of the first forwarding tunnel and that is corresponding to the preset period.

For example, the preset period is 10 seconds, a total quantity of data packets in the first counting packet that is sent by the first counting packet sending subunit 801 to the second network node is 1000, and a total quantity of data packets that are in the returned second counting packet received by the second counting packet receiving subunit 802 and that are received by the second network node from the first network node is 950. After the preset period of 10 seconds, a total quantity of data packets in the first counting packet that is sent by the first counting packet sending subunit 801 to the second network node again is 1200, and a total quantity of data packets that are in the returned second counting packet received by the second counting packet receiving subunit 802 and that are received by the second network node from the first network node is 1140. The first packet loss rate calculation subunit 803 may obtain, by means of calculation according to the two returned second counting packets, that there are totally 200 data packets sent by the first network node by using the first forwarding tunnel in the preset period, and there are totally 190 data packets received by the second network node by using the first forwarding tunnel. Therefore, 10 data packets are lost, and a packet loss rate may be indicated as 5% or in another manner. Certainly, a total quantity of data packets sent in multiple preset periods may be used to calculate an average value of packet loss rates of the multiple preset periods, and the present application imposes no limitation herein.

It should be noted that, in the prior art, the rated bandwidth of the first forwarding tunnel is a bandwidth condition for the first network device to determine whether to offload traffic to the second data link; however, in this embodiment of the present application, a packet loss rate is calculated, the first available bandwidth is obtained by reducing the rated bandwidth of the first forwarding tunnel by the first preset bandwidth, and the bandwidth condition for determining whether to off load traffic is determined as the first available bandwidth. In this way, a traffic off loading operation may be triggered when traffic forwarded over the first forwarding tunnel does not reach the rated bandwidth of the first forwarding tunnel but already exceeds the first available bandwidth. It should further be noted that if the traffic forwarded over the first forwarding tunnel does not reach the first available bandwidth even after the first preset bandwidth is subtracted once, traffic offloading cannot be triggered. However, when a packet loss rate of the first forwarding tunnel is still higher than the first preset threshold, the first available bandwidth is subsequently reduced, by the first preset bandwidth after the first preset bandwidth is subtracted for the previous time, until the traffic forwarded over the first forwarding tunnel reaches a new first available bandwidth and traffic off loading is triggered, or the packet loss rate of the first forwarding tunnel is lower than the first preset threshold.

The first preset bandwidth may be a preset fixed bandwidth, or may be a bandwidth determined according to a packet loss rate. When the first preset bandwidth is a bandwidth determined according to a packet loss rate, optionally, the present application provides a manner for calculating the first available bandwidth, as shown in formula 1.

It can be learned that in a case in which a packet loss rate of the first forwarding tunnel is relatively high, the first network node reduces a rated bandwidth of the first forwarding tunnel to obtain the first available bandwidth, so that when traffic forwarded over the first forwarding tunnel is increasing, and once the traffic exceeds the first available bandwidth, excess to-be-forwarded traffic is off loaded to the second data link for forwarding. Because the first available bandwidth is less than an original rated bandwidth of the first forwarding tunnel, to-be-forwarded traffic exceeds the first available bandwidth at an earlier time, traffic is offloaded by the first network node in advance, and a serious packet loss is less likely to occur before traffic offloading, so that user experience is improved.

After the rated bandwidth of the first forwarding tunnel is reduced by the first preset bandwidth because of a relatively high packet loss rate of the first forwarding tunnel, as a network forwarding state changes and the packet loss rate decreases, the first network device needs to gradually restore the rated bandwidth of the first forwarding tunnel, so as to improve a traffic forwarding capability of the first forwarding tunnel on the first data link, thereby avoiding a waste of network resources. In this embodiment of the present application, a size of the packet loss rate of the first forwarding tunnel is determined, so as to increase the bandwidth of the first forwarding tunnel.

Figure 9:
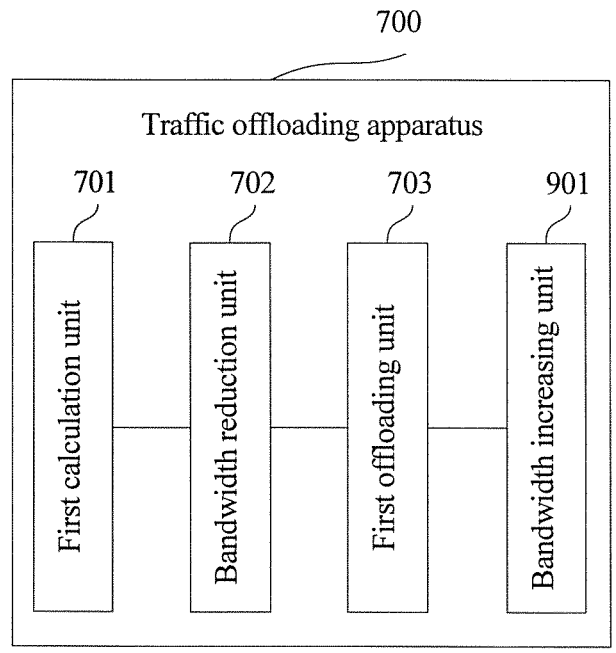
FIG. 9 is a structural diagram of a traffic offloading apparatus according to an embodiment of the present application.

On the basis of the embodiment shown in FIG. 7, FIG. 9 is a structural diagram of a traffic offloading apparatus according to an embodiment of the present application. As shown in FIG. 9, the traffic offloading apparatus 700 further includes a bandwidth increasing unit 901. The bandwidth increasing unit 901 is configured to: when an execution result of the first calculation unit 701 is that the first packet loss rate is lower than a second preset threshold, increase the first available bandwidth by a second preset bandwidth, so as to obtain a second available bandwidth, where the second preset bandwidth is less than or equal to the first preset bandwidth, and the second available bandwidth is less than or equal to the rated bandwidth of the first forwarding tunnel that is of the first data link and that is from the first network node to the second network node.

It should be first noted that a sequence of triggering of the first offloading unit 703 and the bandwidth increasing unit 901 is not limited. The bandwidth increasing unit 901 does not necessarily need to be triggered after the first offloading unit 703 is triggered. The bandwidth increasing unit 901 may be triggered after the bandwidth reduction unit 702 is triggered and the first available bandwidth is obtained, so as to determine whether the first packet loss rate is lower than the second preset threshold. The second preset threshold is lower than the first preset threshold.

When the first packet loss rate is lower than the second preset threshold, it indicates that forwarding condition of the first forwarding link is relatively good (for example, a quantity of user terminals currently connected to the first forwarding tunnel is reduced). The first network device may gradually increase the first preset bandwidth that is reduced. In a case in which that no traffic is forwarded over the first data link from the first network node to the second network node by using the first forwarding tunnel is not considered, a largest value of the second available bandwidth obtained after the increasing cannot exceed the rated bandwidth of the first forwarding tunnel that is of the first data link and that is from the first network node to the second network node.

After the second preset bandwidth is added once, if the first packet loss rate remains to be lower than the second preset threshold, a bandwidth of the first forwarding tunnel may be continuously increased until the first packet loss rate exceeds the second preset threshold again.

On the first data link, generally, in addition to a forwarding tunnel from the first network node to the second network node, a forwarding tunnel from the second network node to the first network node also exists.

Figure 10:
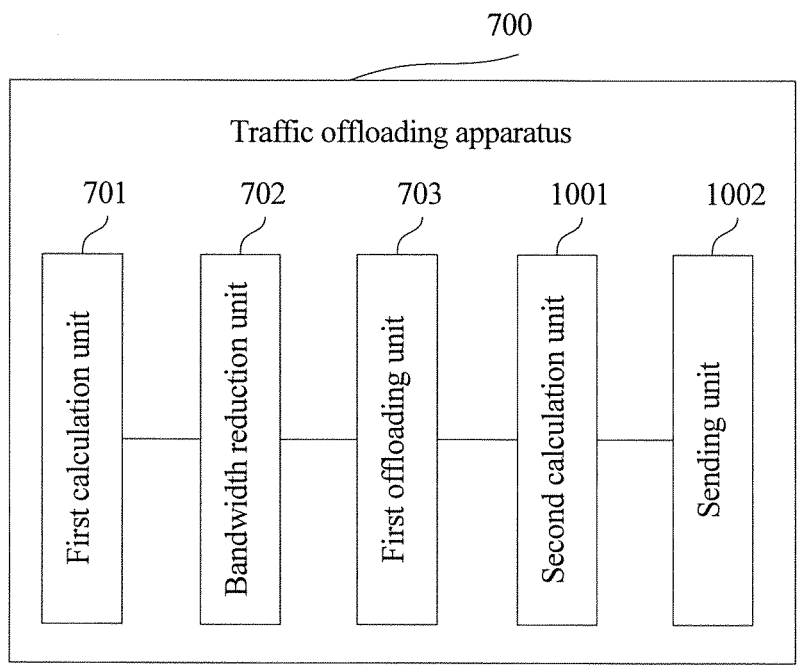
FIG. 10 is a structural diagram of a traffic offloading apparatus according to an embodiment of the present application.

Optionally, on the basis of FIG. 7, FIG. 10 is a structural diagram of a traffic off loading apparatus according to an embodiment of the present application. A second forwarding tunnel from the second network node to the first network node is further established on the first data link, and the first network node and the second network node are respectively a tunnel endpoint of the second forwarding tunnel. As shown in FIG. 10, the traffic offloading apparatus 700 further includes a second calculation unit 1001 and a sending unit 1002. The second calculation unit 1001 is configured to calculate a second packet loss rate of the second forwarding tunnel in the preset period. The sending unit 1002 is configured to send a bandwidth notification packet to the second network node when an execution result of the second calculation unit is that the second packet loss rate is higher than a third preset threshold, where the bandwidth notification packet is used to instruct the second network node to reduce a rated bandwidth of the second forwarding tunnel by a third preset bandwidth, so as to obtain a third available bandwidth.

It should be noted that the second forwarding tunnel forwards traffic from the second network node to the first network node; therefore, when the first network node, which is configured to receive a data packet, calculates the packet loss rate of the second forwarding tunnel in the preset period, generally, a total quantity of data packets sent by the second network node by using the second forwarding tunnel needs to be first acquired. In the following specific application scenario, that how the second calculation unit 1001 calculates the second packet loss rate of the second forwarding tunnel is described.

Because the first network node is a destination endpoint of the second forwarding tunnel, when an operation for reducing the rated bandwidth of the second forwarding tunnel needs to be performed, the first network node needs to instruct the second network node, which is a source endpoint of the second forwarding tunnel, to reduce the rated bandwidth of the second forwarding tunnel, so as to obtain the third available bandwidth. The bandwidth notification packet may be a generic routing encapsulation (Generic Routing Encapsulation, GRE) packet.

Figure 11:
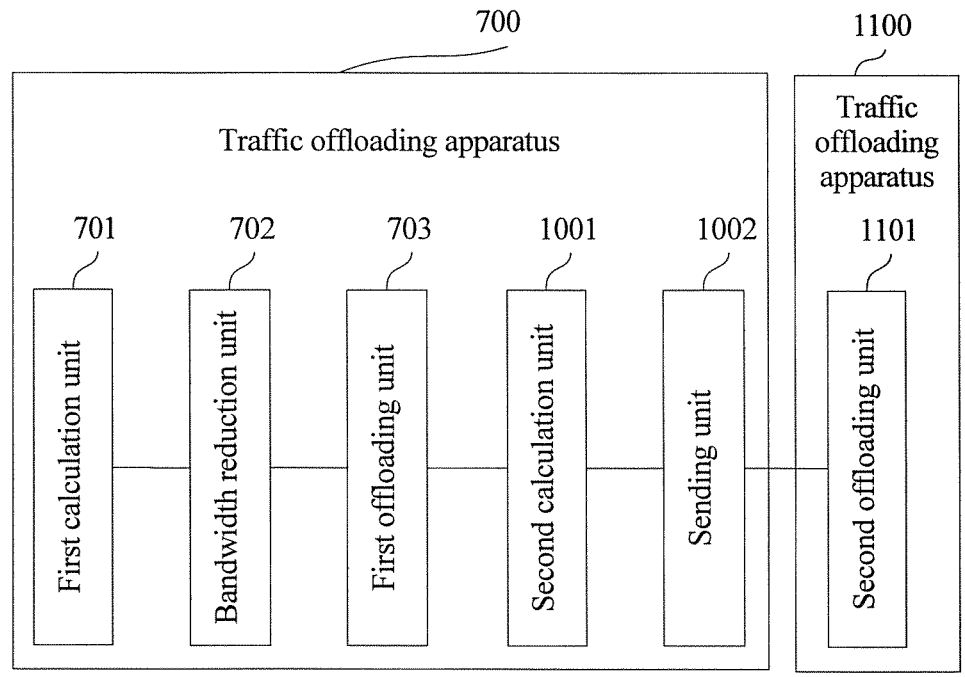
FIG. 11 is a structural diagram of a traffic offloading apparatus according to an embodiment of the present application.

When traffic forwarded over the second forwarding tunnel exceeds the third available bandwidth, an offloading operation on excess bandwidth is also executed by the second network node. That is, optionally, on the basis of the embodiment shown in FIG. 10, FIG. 11 is a structural diagram of a traffic off loading apparatus according to an embodiment of the present application, and a traffic offloading apparatus 1100 includes:

a second offloading unit 1101, configured to: when traffic forwarded over the second forwarding tunnel exceeds the third available bandwidth, offload excess to-be-forwarded traffic to the second data link for forwarding.

Optionally, the first data link includes a digital subscriber line DSL link and an Internet Protocol IP link, and the second data link is a Long Term Evolution LTE link.

Optionally, when the first network node is a home gateway HG, the second network node is a hybrid access aggregation point HAAP; or when the first network node is an HAAP, the second network node is an HG.

It can be learned that in a case in which a packet loss rate of the first forwarding tunnel is relatively high, the first network node reduces a rated bandwidth of the first forwarding tunnel to obtain the first available bandwidth, so that when traffic forwarded over the first forwarding tunnel is increasing, and once the traffic exceeds the first available bandwidth, excess to-be-forwarded traffic is of f loaded to the second data link for forwarding. Because the first available bandwidth is less than an original rated bandwidth of the first forwarding tunnel, to-be-forwarded traffic exceeds the first available bandwidth at an earlier time, traffic is off loaded by the first network node in advance, and a serious packet loss is less likely to occur before traffic offloading, so that user experience is improved. When a packet loss rate of the first forwarding tunnel is gradually reduced to a value less than a second preset threshold, it can be determined that higher traffic may be normally forwarded in a forwarding environment of the first forwarding tunnel. The first network device further increases the first available bandwidth that is obtained after the reduction and that is of the first forwarding tunnel by the second preset bandwidth, so that the first network device may use the first forwarding tunnel to forward higher traffic than before, where the increased traffic refers to traffic supported by the second preset bandwidth. Therefore, when a forwarding environment of the first forwarding tunnel is improved, a first available bandwidth of the first forwarding tunnel is increased, so that the first forwarding tunnel forwards relatively high traffic, thereby improving utilization of network resources.

Embodiment 3

Figure 12:
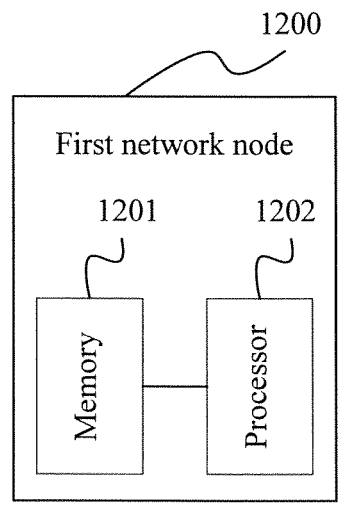
FIG. 12 is a schematic structural diagram of hardware of a first network node according to an embodiment of the present application.

Referring to FIG. 12, FIG. 12 is a schematic structural diagram of hardware of a first network node according to an embodiment of the present application. A first network node 1200 and a second network node are connected by using a first data link and a second data link. A first forwarding tunnel from the first network node 1200 to the second network node is established on the first data link. The first network node 1200 and the second network node are respectively a tunnel endpoint of the first forwarding tunnel. The first network node 1200 includes a memory 1201 and a processor 1202 connected to the memory 1201, where the memory 1201 is configured to store a group of program instructions, and the processor 1202 is configured to invoke a program instruction stored by the memory 1201 to execute the following operations:

calculating a first packet loss rate of the first forwarding tunnel in a preset period;

when the first packet loss rate is higher than a first preset threshold, reducing a rated bandwidth of the first forwarding tunnel by a first preset bandwidth, so as to obtain a first available bandwidth; and when traffic forwarded over the first forwarding tunnel exceeds the first available bandwidth, offloading excess to-be-forwarded traffic to the second data link for forwarding.

Optionally, the processor 1202 may be a central processing unit (Central Processing Unit, CPU), and the memory 1201 may be an internal memory of a random access memory (Random Access Memory, RAM) type. The processor 1202 and the memory 1201 may be integrated into one or more independent circuits or pieces of hardware, for example, an application-specific integrated circuit (Application Specific Integrated Circuit, ASIC).

The word "first" in the first network node, the first data link, the first forwarding tunnel, the first packet loss rate, the first preset threshold, the first preset bandwidth, the first available bandwidth, and the first counting packet according to embodiments of the present application is only used as a name identifier, and does not mean being the first in a sequence. For the words "second" and "third", this rule also applies.

It should be noted that a person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The memory control method and apparatus provided in the present application are described in detail above. The principle and implementation manners of the present application are described herein by using specific embodiments. The description about the embodiments is merely provided to help understand the method and core ideas of the present application. In addition, a person of ordinary skill in the art can make variations and modifications to a specific implementation manner and application scopes according to the ideas of the present application. In conclusion, the content of this specification shall not be construed as a limitation to the present application.

What is claimed is:

1. A traffic offloading method, wherein a first network node and a second network node are connected by using a first data link and a second data link, a first forwarding tunnel from the first network node to the second network node is established on the first data link, and the first network node and the second network node are respectively a tunnel endpoint of the first forwarding tunnel; the method comprising:

calculating, by the first network node, a first packet loss rate of the first forwarding tunnel in a first period;

when the first packet loss rate is higher than a first threshold, reducing, by the first network node, a rated bandwidth of the first forwarding tunnel by a first bandwidth to obtain a first available bandwidth; and when traffic forwarded over the first forwarding tunnel exceeds the first available bandwidth, offloading, by the first network node, excess to-be-forwarded traffic to the second data link for forwarding;

wherein calculating, by the first network node, the first packet loss rate of the first forwarding tunnel in the first period comprises:

sending, by the first network node, a first counting packet to the second network node at an interval of the first period, wherein the first counting packet carries a total quantity of data packets sent by the first network node to the second network node in the first period by using the first forwarding tunnel, receiving, by the first network node, a second counting packet returned by the second network node, wherein the second counting packet carries the total quantity that is carried in the first counting packet and that is of data packets sent by the first network node to the second network node in the first period by using the first forwarding tunnel, and a total quantity of data packets received by the second network node from the first network node in the first period by using the first forwarding tunnel, and calculating, by the first network node according to the total quantity that is carried in the second counting packet and that is of the data packets sent by the first network node to the second network node, and the total quantity of the data packets received by the second network node from the first network node, the first packet loss rate that is of the first forwarding tunnel and that is corresponding to the first period.

2. The method according to claim 1, further comprising:
when the first packet loss rate is lower than a second threshold, increasing, by the first network node, the first available bandwidth by a second bandwidth, to obtain a second available bandwidth, wherein the second bandwidth is less than or equal to the first bandwidth, and the second available bandwidth is less than or equal to the rated bandwidth of the first forwarding tunnel that is of the first data link and that is from the first network node to the second network node.

3. The method according to claim 1, wherein a second forwarding tunnel from the second network node to the first network node is further established on the first data link, and the first network node and the second network node are respectively a tunnel endpoint of the second forwarding tunnel; the method further comprising:

calculating, by the first network node, a second packet loss rate of the second forwarding tunnel in the first period; and when the second packet loss rate is higher than a third threshold, sending, by the first network node, a bandwidth notification packet to the second network node for instructing the second network node to reduce a rated bandwidth of the second forwarding tunnel by a third bandwidth to enable the second network node to obtain a third available bandwidth.

4. The method according to claim 3, further comprising:
when traffic forwarded over the second forwarding tunnel exceeds the third available bandwidth, offloading, by the second network node, excess to-be-forwarded traffic to the second data link for forwarding.

5. The method according to claim 1, wherein:
the first data link comprises a digital subscriber line (DSL) link and an Internet Protocol (IP) link; and
the second data link is a Long Term Evolution (LTE) link.

6. The method according to claim 1, wherein:
when the first network node is a home gateway (HG), the second network node is a hybrid access aggregation point (HAAP); or
when the first network node is an HAAP, the second network node is an HG.

7. A traffic offloading apparatus, wherein a first network node and a second network node are connected by using a first data link and a second data link, a first forwarding tunnel from the first network node to the second network node is established on the first data link, and the first network node and the second network node are respectively a tunnel endpoint of the first forwarding tunnel; the apparatus comprises:

a non-transitory memory storing instructions; and
a processor coupled to the non-transitory memory; wherein the instructions, when executed by the processor, cause the apparatus to be configured to:

send a first counting packet to the second network node at an interval of the first period, wherein the first counting packet carries a total quantity of data packets sent by the first network node to the second network node in the first period by using the first forwarding tunnel, receive a second counting packet returned by the second network node, wherein the second counting packet carries the total quantity that is carried in the first counting packet and that is of data packets sent by the first network node to the second network node in the first period by using the first forwarding tunnel, and a total quantity of data packets received by the second network node from the first network node in the first period by using the first forwarding tunnel, calculate, according to the total quantity that is carried in the second counting packet and that is of the data packets sent by the first network node to the second network node, and the total quantity of the data packets received by the second network node from the first network node, the first packet loss rate that is of the first forwarding tunnel and that is corresponding to the first period, when the first packet loss rate is higher than a first threshold, reduce a rated bandwidth of the first forwarding tunnel by a first bandwidth, so as to obtain a first available bandwidth; and when traffic forwarded over the first forwarding tunnel exceeds the first available bandwidth, offload excess to-be-forwarded traffic to the second data link for forwarding.

8. The apparatus according to claim 7, wherein the instructions, when executed by the processor, further cause the apparatus to be configured to:

when the first packet loss rate is lower than a second threshold, increase the first available bandwidth by a second bandwidth to obtain a second available bandwidth, wherein the second bandwidth is less than or equal to the first bandwidth, and the second available bandwidth is less than or equal to the rated bandwidth of the first forwarding tunnel that is of the first data link and that is from the first network node to the second network node.

9. The apparatus according to claim 7, wherein a second forwarding tunnel from the second network node to the first network node is further established on the first data link, and the first network node and the second network node are respectively a tunnel endpoint of the second forwarding tunnel; wherein the instructions, when executed by the processor, further cause the apparatus to be configured to:
   calculate a second packet loss rate of the second forwarding tunnel in the first period; and
   send a bandwidth notification packet to the second network node when the second packet loss rate is higher than a third threshold for instructing the second network node to reduce a rated bandwidth of the second forwarding tunnel by a third bandwidth to enable the second network node to obtain a third available bandwidth.

10. The apparatus according to claim 9, wherein the instructions, when executed by the processor, further cause the apparatus to be configured to:
   when traffic forwarded over the second forwarding tunnel exceeds the third available bandwidth, offload excess to-be-forwarded traffic to the second data link for forwarding.

11. The apparatus according to claim 7, wherein:
the first data link comprises a digital subscriber line (DSL) link and an Internet Protocol (IP) link; and
the second data link is a Long Term Evolution (LTE) link.

12. The apparatus according to claim 7, wherein:
when the first network node is a home gateway (HG), the second network node is a hybrid access aggregation point (HAAP); or
when the first network node is an HAAP, the second network node is an HG.

* * * * *